Oct. 7, 1952          A. G. KANDOIAN          2,613,349
ANTENNA
Filed Aug. 27, 1949
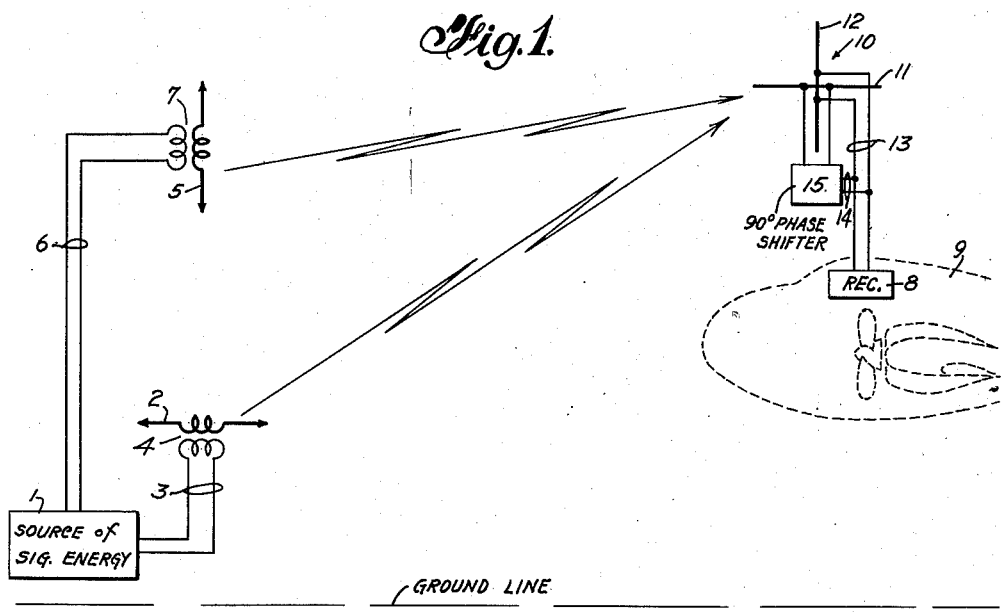
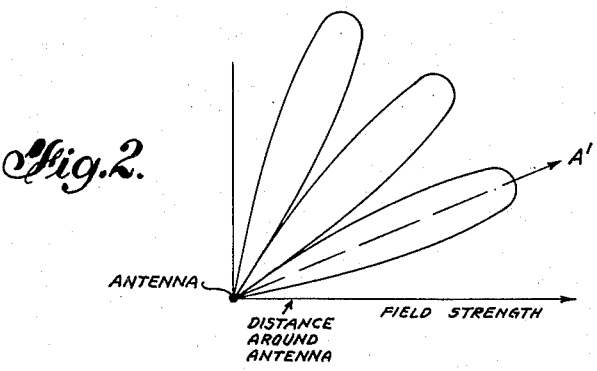
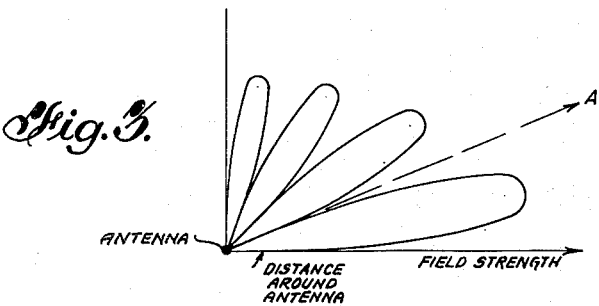
INVENTOR
ARMIG G. KANDOIAN
BY
ATTORNEY Patented Oct. 7, 1952

2,613,349

UNITED STATES PATENT OFFICE 2,613,349

ANTENNA

Armig G. Kandoian, Glen Rock, N. J., assignor to International Standard Electric Corporation, New York, N. Y., a corporation of Delaware Application August 27, 1949, Serial No. 112,820

7 Claims. (Cl. 343—100)

This invention relates to a radio signalling system.

In radio signalling systems wherein the waves are transmitted from a vertical antenna mounted near the ground the waves are vertically polarized and null regions occur, due to reflections of the waves by the ground in the space around the antenna. When a radio receiver is in this space, as when carried on an airplane travelling therein, the signals are heard until a null region is encountered whereupon reception ceases and a portion of the signal may be lost until the plane enters a region where the electric field strength is adequate. Similar adverse conditions prevail if an antenna, for example, a horizontally positioned one, is used and the radiated waves are horizontally polarized, null regions being produced by earth reflection of these waves. These phenomena become more pronounced as the signalling frequency is increased and, in the frequency range of 200 to 400 mc. are very detrimental to good reception.

It is an object of the present invention to provide a signalling system in which such regions of zero field strength do not occur at varying heights and distances from the transmitter and a receiver therein will receive the signal in the entire space around the antenna system.

Another object of the invention is the provision of a transmitting system in which the waves are radiated from two antennas simultaneously, one radiating vertically polarized waves and the other horizontally polarized waves, and of a receiver for receiving the waves on an antenna responsive to circularly polarized waves.

According to the foregoing, at all points in the field in which the receiver is located, there is the problem of providing sufficient field strength at least in one polarization or the other to produce a desired signal-to-noise ratio. Under the circumstances this means that nulls, or spaces between lobes, of one polarization shall be substantially filled by lobes of the other polarization. To bring about such a result, consideration must be given to several underlying factors entering into the determination of the field strength. Important among these are the relative magnitudes of the reflection coefficients including the additional fact that in case of the vertically polarized component, there is a minimum at the Brewster angle. Also the relative phase shifts, throughout a range of angles of incidence are important. These factors are known or are determinable for a given set of conditions including earth constants. One important condition is the angle of incidence. Therefore, it is reasonable to expect that field patterns for the two types of polarizations can be found with magnitude which are comparable and sufficient to escape the effects of serious ground variations, and the effects of the Brewster angle, and still be within practical values of the angle of incidence. This problem as stated, however, involves also such a displacement of lobes in space that the set thereof of one polarization substantially fills the nulls of the other polarization. This result is effected at least in part by locating the respective radiation antennas at different levels. Though mere height diversity has been proposed, such proposals have involved among other undesirable features lobe switching which is difficult particularly at high powers, and there will still be cancellation if the polarization of the two antennas is similar and both are simultaneously energized.

Accordingly, it is a further object of the present invention to provide a method and means of transmitting wave energy from sources disposed at different levels and with different types of electric polarization.

A still further object is the provision of a method of continuously receiving wave energy transmitted in separate differently polarized portions.

Other and further objects of my invention will be better understood from the following description of an embodiment thereof, reference being made to the drawing, in which:

Figure 1 is a schematic diagram of a transmitter and receiver embodying the invention, a portion of an airplane in which the receiver is mounted also being shown;

Figure 2 shows the electric field pattern in a vertical plane through the antenna radiating horizontally polarized high frequency waves; and Figure 3 shows the electric field pattern in a vertical plane through the antenna radiating vertically polarized high frequency waves.

Referring to Figure 1, a source 1 of ultra high frequency signal waves is connected to a horizontally mounted antenna 2 by a line 3 and any suitable coupling means, illustrated as coils 4. Antenna 2 may be of any known type which radiates horizontally polarized waves as, for example, a loop with its turns disposed horizontally. Source 1 also supplies signal currents to a vertically mounted antenna 5 through a line 6 and coupling means 7. The vertical antenna 5 may be of any type which radiates vertically polarized waves and is mounted directly above antenna 2 but at a substantially higher level. Although this is the preferred arrangement, it will be understood that the positions of the antennas may be reversed, the vertical one being mounted at the lower level and the horizontal one which radiates the horizontally polarized waves mounted directly above it. The difference in heights of the two antennas will be referred to later.

In the illustrated example, the signals are impressed on a receiver 8 mounted in an airplane 9, only the front portion of which is shown. The antenna 10 on which the waves are received is shown as being mounted outside the airplane and may be of any type adapted for the reception of circularly polarized waves. Antenna 10, as shown by way of an example, comprises two dipoles 11 and 12 located at 90 degrees to one another and in the same plane with their centers on the same axis. Dipole 12 is connected to the received input by a line 13 and dipole 11 is connected to line 13 by a line 14 and phase shifter 15 which shifts the phase of the currents supplied by dipole 11 through 90 degrees. Antenna 10 is thus adapted to supply signal currents to the receiver whether it is in a region of the field which is vertically polarized or horizontally polarized or whether both types of polarization are present.

With antenna 2 at a certain height above ground and providing an electric field pattern of the horizontal polarization as shown by Figure 2, vertical antenna 5 is mounted directly over antenna 2 at such a height that the electric field pattern of its vertically polarized waves assumes the shape represented by the lobes of Figure 3. It will be noted that the null points of these figures do not coincide. For example, in the direction indicated by the line A of Figure 3 where there is a null of the vertically polarized field, there is a strong horizontally polarized field, as indicated by the vector A' of Figure 2. The result of providing field patterns of the type described is that antenna 10 will be continually effective in picking up signal energy for the receiver as the airplane occupies different positions in the space about the antennas. In one location of the airplane, the electric field energizing the antenna 10 may be entirely or predominantly vertically polarized; while in another location of the plane, the field may be entirely or predominantly horizontally polarized. Continuous coverage in the space around the antenna system is thus assured.

While I have described above the principles of my invention in connection with specific apparatus, it is to be clearly understood that this description is made only by way of example and not as a limitation on the scope of the invention as above set forth in the objects thereof and the accompanying claims.

What is claimed is:

1. Means for transmitting high frequency waves comprising an antenna disposed at a given elevation and arranged to radiate vertically polarized waves, a second antenna disposed at a different elevation than the first antenna and arranged to radiate horizontally polarized waves, the difference in elevations of said antennas being sufficient that in the space about the antennas the null points of the vertical polarizations are non-coincident with the null points of the horizontal polarization, and means for supplying said antennas simultaneously with high frequency energy.

2. Transmitting means according to claim 1, wherein the first antenna is higher than the second antenna.

3. Transmitting means according to claim 1, wherein the first antenna is mounted directly above the second antenna.

4. Means for transmitting waves of ultra high frequency comprising an antenna fixed at a given height above ground and arranged to radiate vertically polarized waves, a second antenna fixed at a different height than the first antenna and arranged to radiate horizontally polarized waves, the distance between said antennas being such that wave energy characterized by at least one of said vertical and horizontal polarizations is continually present at all points in the space surrounding said antennas, and means for supplying said antennas simultaneously with energy of a given ultra high frequency.

5. Transmitting means according to claim 4, wherein the first antenna is higher than the second antenna.

6. Transmitting means according to claim 4, wherein the second antenna is mounted directly below the first antenna.

7. An ultra high frequency signalling system comprising an antenna mounted at a given height and arranged to radiate vertically polarized waves, a second antenna mounted at a different height than the first antenna and arranged to radiate horizontally polarized waves, the heights of said antennas being so selected that null regions due to reflection of the vertically polarized waves are spaced from the null regions due to reflection of the horizontally polarized waves; means for supplying said antennas simultaneously with energy of a given ultra high frequency, and a receiver having a receiving antenna responsive to circularly polarized waves.

ARMIG G. KANDOIAN.

REFERENCES CITED

The following references are of record in the file of this patent:

UNITED STATES PATENTS

| Number | Name | Date |
| --- | --- | --- |
| 1,965,184 | Gothe | July 3, 1934 |
| 2,213,859 | Hahnemann | Sept. 3, 1940 |
| 2,242,910 | Hahnemann | May 20, 1941 |
| 2,320,518 | George | June 1, 1943 |